(12) United States Patent
Arno et al.

(10) Patent No.: US 7,361,214 B2
(45) Date of Patent: Apr. 22, 2008

(54) DISPOSABLE CARTRIDGE FOR AIR/GAS DRYER

(75) Inventors: Michael J. Arno, Clarence, NY (US);
Daniel Blaszkowiak, Cheektowaga, NY (US); John Carlin, Buffalo, NY (US)

(73) Assignee: Illinois Tool Works Inc., Glenview, IL (US)

( * ) Notice: Subject to any disclaimer, the term of this patent is extended or adjusted under 35 U.S.C. 154(b) by 222 days.

(21) Appl. No.: 11/084,843

(22) Filed: Mar. 18, 2005

(65) Prior Publication Data

US 2005/0247201 A1   Nov. 10, 2005

Related U.S. Application Data

(60) Provisional application No. 60/554,561, filed on Mar. 19, 2004.

(51) Int. Cl.
*B01D 53/04* (2006.01)
*B01D 53/26* (2006.01)

(52) U.S. Cl. .............................. 96/138; 96/147; 96/151; 55/357; 55/515; 55/DIG. 17

(58) Field of Classification Search ............... 96/117.5, 96/134, 135, 137, 138, 147, 149, 151, 152, 96/153; 210/282; 55/356, 357, 515, DIG. 17
See application file for complete search history.

(56) References Cited

U.S. PATENT DOCUMENTS

| | | |
|---|---|---|
| 1,190,221 A | 7/1916 | Daugherty |
| 1,681,531 A | 8/1928 | Gannon |
| 1,750,632 A | 3/1930 | Farmer |
| 1,839,350 A | 1/1932 | Slagel |
| 1,866,659 A | 7/1932 | Litle, Jr. |
| 2,199,258 A | 4/1940 | Gray ........................ 210/131 |
| 2,214,925 A | 9/1940 | Gutrie ........................ 252/2 |

(Continued)

FOREIGN PATENT DOCUMENTS

EP   0042683 A1   12/1981

(Continued)

OTHER PUBLICATIONS

Viskon-Aire, Camair TS-10 Desiccant Air Dryer, Nov. 1992, 2 pages.

*Primary Examiner*—Frank M. Lawrence
(74) *Attorney, Agent, or Firm*—Steven W. Weinrieb (57) ABSTRACT

A disposable dryer cartridge for an air/gas dryer apparatus for installation in an air/gas line delivering compressed air or gas to an air/gas-driven tool. The cartridge includes a flexible elongated casing having a drying composition therein. The casing has an air/gas inlet and an air/gas outlet thereon. A handle is also provided on the casing. The casing is self-configurable into a cross-sectionally contracted configuration when lifted by the handle to facilitate insertion in or removal from an air/gas dryer apparatus. Following insertion of the casing in an air/gas dryer, it is manipulated as necessary to reconfigure the casing from the contracted configuration to an operational configuration wherein the casing is not cross-sectionally contracted and wherein the drying composition is compacted. When the casing needs replacement, it can be grasped by the handle and lifted to re-effect the contracted configuration and thereby removed from the dryer.

20 Claims, 8 Drawing Sheets

U.S. PATENT DOCUMENTS

| | | | |
|---|---|---|---|
| 2,273,779 A | 2/1942 | Dickey et al. | 183/75 |
| 2,325,657 A | 8/1943 | Burkness | 210/134 |
| 2,526,782 A | 10/1950 | Thorpe | 183/45 |
| 2,526,938 A | 10/1950 | Davis et al. | 252/408 |
| 2,536,274 A | 1/1951 | Gaugler | 210/131 |
| 2,554,879 A | 5/1951 | Race, Jr. | 183/4.8 |
| 2,558,125 A | 6/1951 | Cullen | 55/433 |
| 2,579,053 A | 12/1951 | Schulstadt | 210/131 |
| 2,593,132 A | 4/1952 | Gannon | 183/4.8 |
| 2,649,923 A | 8/1953 | Woppman | 183/4.8 |
| 2,671,526 A | 3/1954 | Hunt et al. | 183/4.8 |
| 2,671,528 A | 3/1954 | Gross | 183/49 |
| 2,751,999 A | 6/1956 | Semon | 55/513 |
| 2,845,138 A | 7/1958 | Gageby | 183/4.8 |
| 2,987,175 A | 6/1961 | Bottum | 206/46 |
| 3,008,540 A | 11/1961 | Gibson, Jr. | 96/121 |
| 3,029,581 A | 4/1962 | Robbins | 55/316 |
| 3,047,993 A | 8/1962 | Robbins | 55/274 |
| 3,090,490 A | 5/1963 | Yocum | 210/299 |
| 3,169,112 A | 2/1965 | Nelson | 210/266 |
| 3,203,551 A | 8/1965 | Van Loan, Jr. | |
| 3,209,917 A | 10/1965 | Yelinek | 210/484 |
| 3,240,567 A | 3/1966 | Caparreli et al. | 23/284 |
| 3,246,758 A | 4/1966 | Wagner | 210/94 |
| 3,358,428 A | 12/1967 | Mann | 55/387 |
| 3,410,061 A | 11/1968 | Knight | |
| 3,415,041 A | 12/1968 | Kraissl, Jr. | 55/342 |
| 3,464,186 A | 9/1969 | Hankison et al. | 55/163 |
| 3,479,146 A | 11/1969 | Hochman et al. | 23/288 |
| 3,559,381 A | 2/1971 | Fesco | |
| 3,678,662 A | 7/1972 | Grote | |
| 3,681,899 A | 8/1972 | Grote | 55/503 |
| 3,705,480 A | 12/1972 | Wireman | 55/275 |
| 3,724,177 A | 4/1973 | Grote | 55/316 |
| 3,941,573 A | 3/1976 | Chapel | 55/316 |
| 4,015,959 A | 4/1977 | Grote | |
| 4,032,307 A | 6/1977 | Sommerfeld | |
| 4,177,049 A | 12/1979 | Haslett, Jr. | 55/483 |
| 4,478,619 A | 10/1984 | Arends et al. | 55/0 |
| 4,548,624 A | 10/1985 | Waller | 55/274 |
| 4,572,725 A * | 2/1986 | Kojima | 96/137 |
| 4,600,416 A | 7/1986 | Mann | |
| 4,612,026 A | 9/1986 | Pollara et al. | 96/117.5 |
| 4,705,543 A | 11/1987 | Kertzman | 96/6 |
| 4,741,697 A | 5/1988 | Herbison | 433/25 |
| 4,746,338 A | 5/1988 | Williams | 55/275 |
| 4,770,678 A | 9/1988 | Haslett, Jr. | 55/179 |
| 4,811,571 A | 3/1989 | Mayer | 62/474 |
| 4,822,387 A | 4/1989 | Daniels | 55/323 |
| 4,828,589 A * | 5/1989 | Bauer et al. | 96/109 |
| 5,110,330 A | 5/1992 | Loughran | 55/275 |
| 5,215,660 A | 6/1993 | Mosher et al. | |
| 5,240,483 A | 8/1993 | Rosen | 96/137 |
| 5,350,442 A | 9/1994 | Thelen et al. | 95/115 |
| 5,427,609 A | 6/1995 | Zoglman et al. | 95/98 |
| 5,580,451 A | 12/1996 | Tack | 210/266 |
| 5,630,855 A | 5/1997 | Lundbäck | 96/405 |
| 5,667,566 A | 9/1997 | Flynn et al. | 96/138 |
| 5,681,370 A | 10/1997 | McMahon | 95/105 |
| 5,683,499 A | 11/1997 | Kiyani | 96/147 |
| 5,746,807 A | 5/1998 | Thelen et al. | 95/123 |
| 5,846,271 A | 12/1998 | Flynn et al. | 55/315 |
| 6,071,322 A | 6/2000 | Hulthen | |
| 6,106,596 A | 8/2000 | Haramoto et al. | |
| 6,309,450 B1 | 10/2001 | Millen et al. | 96/131 |
| 6,402,811 B1 | 6/2002 | Shanks et al. | 95/90 |
| 6,585,173 B2 | 7/2003 | Schmon et al. | 239/526 |
| 6,786,947 B2 | 9/2004 | Mountford | |
| 6,835,234 B2 | 12/2004 | Leffel et al. | 96/108 |
| 2005/0132887 A1 | 6/2005 | Mitsch et al. | 96/108 |

FOREIGN PATENT DOCUMENTS

| | | |
|---|---|---|
| JP | 54-46185 A | 4/1979 |
| WO | WO 2005089221 | 9/2005 |

* cited by examiner

DISPOSABLE CARTRIDGE FOR AIR/GAS DRYER

CROSS-REFERENCE TO RELATED APPLICATIONS

This application claims benefit of the filing date of U.S. Provisional Application Ser. No. 60/554,561 filed on Mar. 19, 2004. This application also relates to copending application Ser. No. 11/084,852, filed on even date herewith and entitled "Disposable Cartridge Air/Gas Dryer", the contents of which are fully incorporated herein by this reference.

BACKGROUND OF THE INVENTION

1. Field of the Invention

The present invention relates to the field of compressed air and gas systems, and more particularly to filtering and drying equipment for filtering and removing moisture from compressed air and gas delivered to air/gas-driven tools.

2. Description of Prior Art

Typical compressed air or gas produced by a compressor apparatus is saturated with 50% to 100% relative humidity, and also contains contaminants such as dirt, dust, oil, line debris and other matter. Filters and traps remove liquid water and other contaminants but do nothing to eliminate the 50% to 100% moisture vapor introduced by compressors, air lines, fittings, regulators and other equipment. This can cause problems in applications such as paint booth operations where compressed air or gas is used as a propellant to atomize and expel paint from a paint gun. If moisture-laden ambient air is delivered through the air/gas line, it will feed through the paint gun, and may cause unwanted fouling that results in a bad and unacceptable paint job.

The removal of this moisture vapor requires that an air/gas dryer system be used, such as a refrigerated dryer or an adsorbent type of dryer. Such systems are generally very effective, the latter being typically capable of drying compressed air or gas to below-zero dew point levels. There are several types of adsorbent dryers available for different applications. Large centralized adsorbent dryers are used in factories and other environments where compressed air/gas must be delivered to multiple points-of-use, such as a group of assembly line workers operating air tools. Such dryers are large complicated devices that are intended to be serviced by experienced technicians, as when the adsorbent therein is spent and needs to be replaced. At the other end of the spectrum, disposable point-of-use adsorbent dryers are available that can be connected between the end of an air/gas line and an air/gas tool (such as a paint gun). These simple devices are intended to be disposed of after a relatively small number of applications (e.g., painting several cars), when the modest amount of adsorbent material therein will usually be spent. Occupying a middle ground of the adsorbent dryer spectrum are various near point-of-use dryers adapted for in-line placement within approximately 10-20 feet (or less) of a point-of-use. For example, a commercial paint booth will often have a small adsorbent dryer mounted on the wall of the booth. These systems typically comprise adsorbent-containing canisters in which are disposed a quantity of desiccant or other adsorbent, or a removable cartridge containing such material. The inlet side of the canister receives moist air/gas from a compressed air/gas source while the canister's outlet side delivers dry air/gas to a short air/gas hose that the user connects to a point-of-use tool. In most such systems, the canister is a generally hollow cylinder that is approximately one foot in height and approximately six inches in diameter. Other sizes are also available, depending on drying capacity requirements.

A disadvantage of the above-described near point-of-use adsorbent dryer systems is that the removal and replacement of adsorbent requires disassembly of the canister or cartridge and the removal of the loose granular adsorbent therefrom for recycling, followed by the reintroduction of fresh adsorbent. This procedure can be messy, time consuming, and wasteful of adsorbent insofar as it is almost always the case that some of the adsorbent will spill out, scatter and become lost during the removal and recharging process. If a cartridge is involved, it needs to be disconnected from cartridge carrying components within the dryer and then reconnected thereto following recharging. As a result, personnel who use compressed air/gas tools typically do not want to be bothered with the task of replenishing these systems with new adsorbent when the old material is spent, and thus may continue to use them even after their moisture vapor removal capabilities are no longer optimal. Such personnel may adopt a "let the next guy do it" attitude when in comes to properly servicing and maintaining these systems.

A further consideration that must be taken into account when using a near point-of-use adsorbent drying system is the need to employ adequate means to ensure that any water slugs in the compressed air/gas are separated and drained off before reaching the adsorbent. Contaminants such as compressor debris, oil, dirt, and the like also need to be filtered, typically down to approximately 0.1 micron or below. In conventional near point-of-use adsorbent dryer systems, separate coalescer and filter canisters are typically placed next to the adsorbent-containing canister to perform these functions. Each of these will have its own filter element that must be periodically removed and replaced. There also needs to be a means to filter out adsorbent "dust" before the dried air/gas is exited from the dryer for use in an application. Conventional near point-of-use adsorbent dryers provide an additional filter for this purpose, and this filter must also be periodically serviced.

It is to solving the foregoing problems that the present invention is directed. What is needed is an improved cartridge for use in an air/gas dryer adapted for near point-of-use operation. The cartridge should be easy to install and use, and simple to maintain. It should also be suitable for use as the primary or sole air/gas moisture vapor treatment component in a compressed air/gas system that serves a small number of users. The cartridge should be capable of reducing moisture vapor content in a compressed air/gas stream down to a relative humidity of less than ½% (−40 degrees F. dew point). This means the no moisture will condense into liquid water until the compressed air/gas sees a temperature of −40 degrees F. below zero.

SUMMARY OF THE INVENTION

The foregoing problems are solved and an advance in the art is achieved by a disposable dryer cartridge for an air/gas dryer apparatus that is adapted for near point-of-use installation in an air/gas line delivering compressed air or gas to an air/gas-driven tool. The cartridge includes a flexible elongated casing having a drying composition therein. The casing has an air/gas inlet and an air/gas outlet thereon. A handle is provided on the casing. The casing is self-configurable into a cross-sectionally contracted configuration when lifted by the handle in order to facilitate insertion in or removal from an air/gas dryer apparatus. Following insertion of the casing in the air/gas dryer, it can be manipulated as necessary to reconfigure the casing from the contracted configuration to an operational configuration wherein the casing is not cross-sectionally contracted and wherein the drying composition is compacted. When the casing requires replacement, it can be grasped by the handle and lifted to re-effect the contracted configuration, and thereby removed from the dryer.

In exemplary embodiments of the invention, the casing comprises a filter media material that is capable of filtering to approximately 0.1 micron or below. The inlet and the outlet on the casing can be provided by virtue of some or all of the casing comprising the filter media material. The drying composition may comprise a desiccant such as activated alumina or silica gel beads. Depending on the configuration of the air/gas dryer, the casing may comprise a generally tubular sidewall and a generally circular bottom wall at a first end thereof. The casing may comprise a closure fold at a second end thereof. An empty region can be left between the fold and the drying composition. The fold can be used to provide the handle. In a modified version of the cartridge, a side portion of the casing can be made from non-porous material.

In order to fabricate a dryer cartridge according to the invention, the casing can be formed by joining together a first sheet that forms the sidewall on the casing and a second sheet that forms the bottom wall on the casing. The drying composition can be introduced by placing the casing in a mold and pouring the drying composition into the casing. The mold can have a cross-sectional size and shape that conforms to a cartridge-holding chamber in the air/gas dryer in which the cartridge is to operate. The mold can have a length that is longer than the cartridge-holding chamber, and the top of the mold can be used as a gauge for measuring the drying composition. The casing can be folded to create the closure fold following the filling, with the empty region being left between the fold and the drying composition.

BRIEF DESCRIPTION OF THE DRAWINGS

The foregoing and other features and advantages of the invention will be apparent from the following more particular description of preferred embodiments of the invention, as illustrated in the accompanying Drawings in which.

DETAILED DESCRIPTION OF EXEMPLARY EMBODIMENTS

Figure 1:
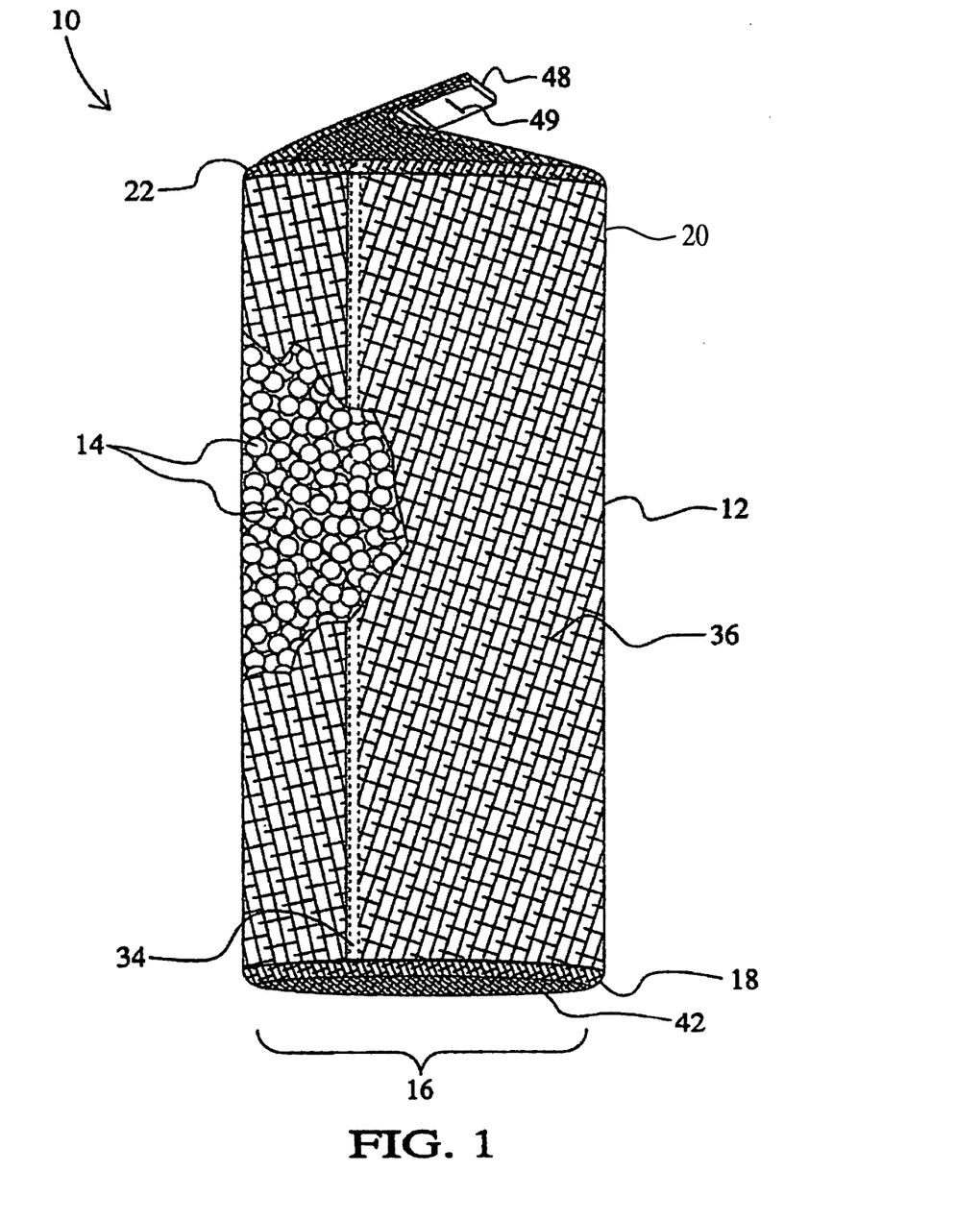
FIG. 1 is a perspective view showing a disposable dryer cartridge constructed in accordance with the present invention.

Turning now to the drawings wherein like reference numerals indicate like elements in all of the several views, FIG. 1 illustrates a disposable dryer cartridge 10 that includes a sack-like fabric casing 12 filled with a quantity of drying composition 14. The cartridge 10 is adapted to operate in a dryer apparatus, such as that shown in FIGS. 6-8, with an air or gas stream passing generally lengthwise through the cartridge 10 so that the air or gas is dried as result of interfacial contact with the drying composition 14. A generally flat bottom face 16 situated at a lower end 18 of the casing 12 serves as an air inlet thereto. A circumferential section 20 situated at an upper end 22 of the casing 12 serves as an air outlet therefrom. The cross-sectional shape of the casing 12 is generally circular, which results in the cartridge 10 having a generally tubular configuration that corresponds to the generally tubular shape of the dryer in which it is used. It will be appreciated that other casing configurations could also be constructed, depending on the shape of the dryer. Indeed, as a general rule, the cross-sectional configuration of the cartridge 10 needs to closely match the cross-sectional configuration of the corresponding dryer, it being necessary for successful operation that substantially all of the compressed air/gas passing through the dryer be required to traverse the cartridge 10. Otherwise, if the cartridge 10 does not fill the cross-sectional area of the dryer, air/gas could channel between the cartridge and the inside wall of the dryer, thereby decreasing the dryer's efficiency.

The casing 12 can be formed from any suitable material that can serve to filter the air/gas stream as it passes therethrough without substantial restriction or pressure drop. The nominal filtering capability of the casing 12 should be approximately 0.1 microns or less (e.g., down to approximately 0.01 microns), which is sufficient to filter out airborne particulates such as dirt, dust, oil, compressor scale, and compression line debris. The casing material must also be strong enough to contain the drying composition 14 when the cartridge 10 is outside of a dryer apparatus, such as during shipment or handling, and when the cartridge is being inserted into or removed from the dryer. The casing material can be woven or non-woven, and can have either a single-layer or multilayer construction. It is contemplated that the cartridge 10 will have a typical size of approximately 5-7 inches across its diameter and a length of approximately 12-15 inches (longer cartridges could also be constructed for more drying capacity). Based on the typical size range, and assuming the drying composition 14 comprises a typical material such as activated alumina or silica gel desiccant beads, the casing 12 will need to be strong enough to hold approximately ten pounds of drying composition. One suitable material that is compatible with the foregoing requirements is a non-woven fabric sold by Kimberly-Clark Corporation of Roswell, Ga. under the trade name Evolution® Series Filtration Media. The Evolution® material is described as being a filtering fabric comprising plural meltblown polypropylene sheets that are thermally bonded together.

Figures 2, 3:
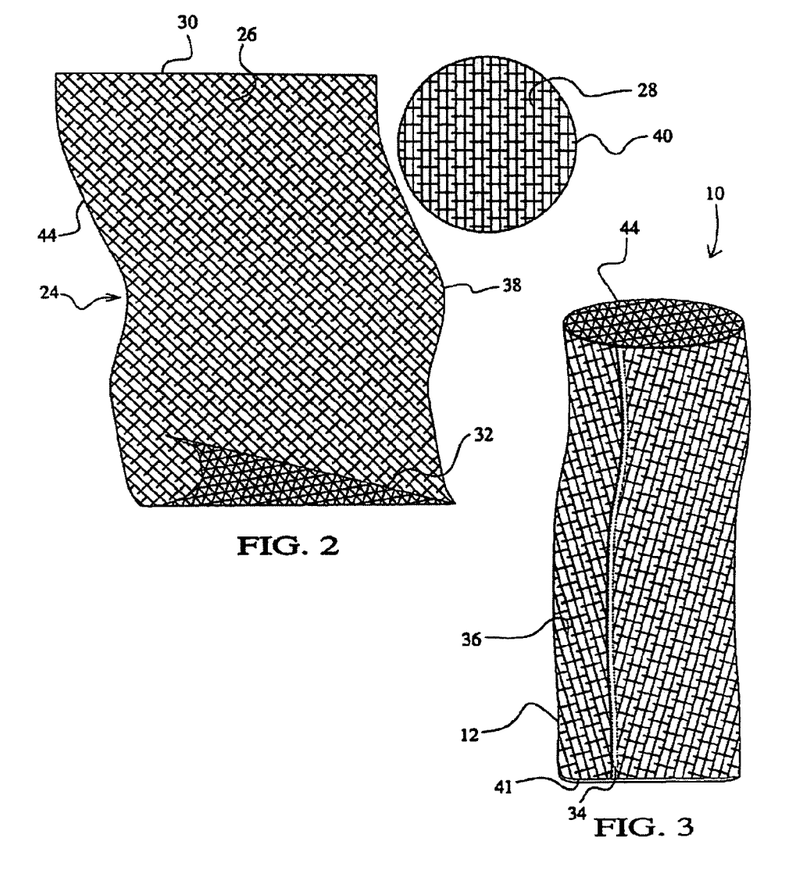
FIG. 2 is an enlarged perspective view showing patterned material sheets that may be used to form the cartridge of FIG. 1.
FIG. 3 is a perspective view showing the material sheets of FIG. 2 after they have been formed into a cylindrical configuration with the bottom end thereof being closed and the top end being open to receive a drying composition.

As shown in FIG. 2, fabrication of the casing 12 begins with a flat sheet 24 of the casing material that is patterned and cut to define a sidewall sheet 26 and a bottom sheet 28. Because the cartridge 10 of FIGS. 1-4 is generally cylindrical, the sidewall sheet 26 is generally rectangular and the bottom sheet 28 is generally circular. Other shapes could be used to provide cartridges having different configurations. Once the sheets 26 and 28 have been prepared, they are joined together by sewing, gluing, heat sealing, etc., to define the required shape of the casing 12. In a first joining step, the side edges 30 and 32 of the sidewall sheet 26 are joined along a longitudinal seam 34, as shown in FIGS. 1 and 3. The result of this joining operation is to form a main cylinder 36 of the casing 12. In a second joining step, the bottom edge 38 of the sidewall sheet 26 is joined with the circumferential edge 40 of the bottom sheet 28 along a circumferential seam 41. The result of this joining operation is to form a generally flat bottom wall 42 on the cylinder 36 (see FIG. 1). In an alternative construction, the bottom sheet 28 could be eliminated, and a bottom wall could be formed on the casing 12 by flattening the lower end of the cylinder 36 and joining together opposing portions of the bottom edge 38 of the sidewall sheet 26. As shown in FIG. 3, the other end of the cylinder 36 will be open along a top edge 44 of the sidewall sheet 26.

Figure 4:
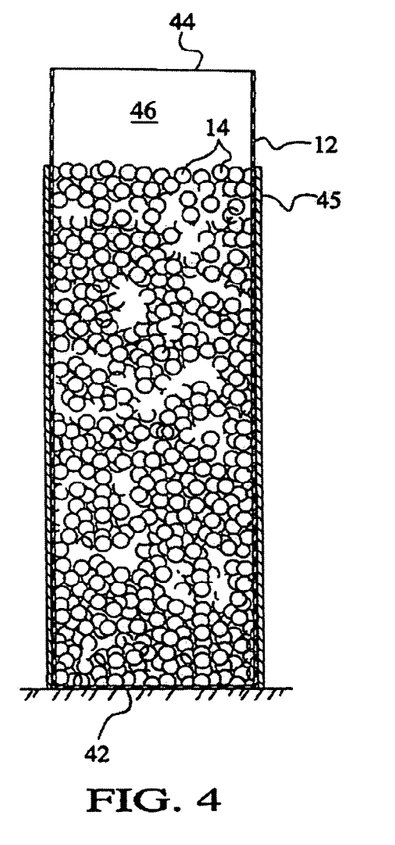
FIG. 4 is a longitudinal centerline view showing the cartridge of FIG. 1 during filling thereof with a drying composition.

Once the bottom wall 42 of casing 12 is formed, the drying composition 14 can be introduced into the casing 12. As shown in FIG. 4, in order to maintain the desired shape of the casing 12 during the filling operation, and to provide a visual gauge of the amount of drying composition being added, the casing can be placed in a cylindrically walled mold 45 and filled until the drying composition reaches the top of the mold. The mold 45 preferably conforms to the size and shape of the dryer in which the cartridge 10 will be used, except that the mold 45 can be longer to account for settling of the drying composition. For example, assuming a typical near point-of-use air/gas dryer having a cartridge-holding chamber that is approximately 5-6 inches in diameter by approximately 12-15 inches in length, and further assuming that the drying composition 14 is activated alumina desiccant beads having a average diameter of approximately 0.125 inches, it has been experimentally determined that the casing 12 should be filled with the desiccant to a level that is approximately 2 inches more than the length of the dryer's cartridge-holding chamber. Thus, the mold would range between approximately 14-17 inches in length.

Figure 5:
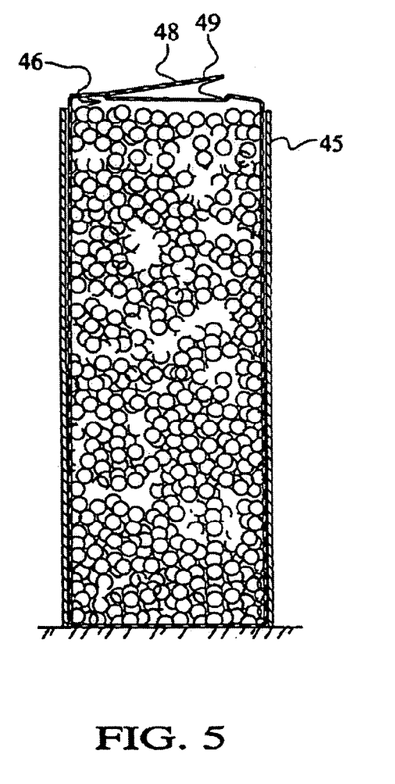
FIG. 5 is a longitudinal centerline view showing the cartridge of FIG. 1 after filling and closure.

It will be seen in FIG. 4 that the casing 12 is longer than the mold 45 and that an empty region 46 extends above the drying composition at the casing's upper end. The region 46 provides room for the casing 12 to be closed to retain the drying composition 14 therein. For a mold 45 that is approximately 5-6 inches in diameter and approximately 14-17 inches in length (see above), the casing 12 can be approximately 3 inches longer than the mold. The closing operation entails flattening the upper end of the casing cylinder 36, joining together opposing portions of the top edge 44, and folding it over (one or more times), as shown by reference numeral 48 in FIG. 5. If desired, prior to creating the fold 48, corner folds (not shown) can be formed at the corners of the top edge 44. This will improve the appearance of the cartridge 10 and prevent the fold 48 from protruding beyond the sidewall of the casing 12. In order to secure the fold 48, a seam 49 is formed by sewing, gluing, stapling or other suitable means. As additionally shown in FIG. 5, following folding, a small portion of the empty region 46 may remain.

The drying composition 14 within the casing 12 comprises a medium that dries compressed air/gas passing through the cartridge 10. The drying composition 14 can be selected from any suitable material having the required drying characteristics, including but not limited to (1) moisture adsorbing desiccants such as activated alumina beads, silica gel beads, clays and molecular sieves, and (2) moisture absorbing fibers such as cotton, paper, wood particles or the like. Due to their superior moisture removal properties, activated alumina desiccant beads of the type commonly used in compressed air/gas drying systems represent the preferred material used for the drying composition 14. The size of the desiccant beads is selected to minimize unwanted pressure drop across the cartridge 10 while providing adequate drying characteristics. The average desiccant bead diameter will preferably lie in a range of approximately 0.1-0.4 inches.

It will be appreciated that increasing the diameter of the desiccant beads tends to reduce the resistance to air/gas flow through the cartridge 10, thereby reducing pressure drop, but also reduces the amount of effective adsorbing surface area. On the other hand, decreasing the size of the desiccant beads increases the amount of adsorbing surface area, but also increases the resistance to air/gas flow, so as to increase the pressure drop through the cartridge 10. Assuming the drying composition 14 consists of 0.1-0.4 inch activated alumina desiccant beads, and is carried within a casing 12 whose operational diameter (with fully packed desiccant) is approximately 5-6 inches and whose length is approximately 12-15 inches, the cartridge 10 should be capable of delivering a relative humidity of as low as ½% (−40 degree F. dew point) at a flow rate of 30 SCFM (Standard Cubic Feet per Minute), with an inlet side pressure of 100 psi and an outlet side pressure of 90-95 psi. Also, with the casing 12 being this size, the cartridge 10 should be able to hold an exceptional charge that would be sufficient, for example, to paint up to 30-50 automobiles (if the cartridge 10 is used in a paint both operation) before needing to be replaced.

Figure 6:
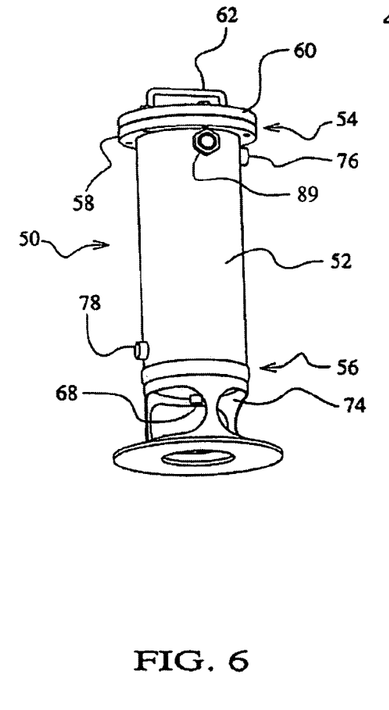
FIG. 6 is a perspective view showing an exemplary air/gas dryer for housing the cartridge of the present invention.
Figure 7:
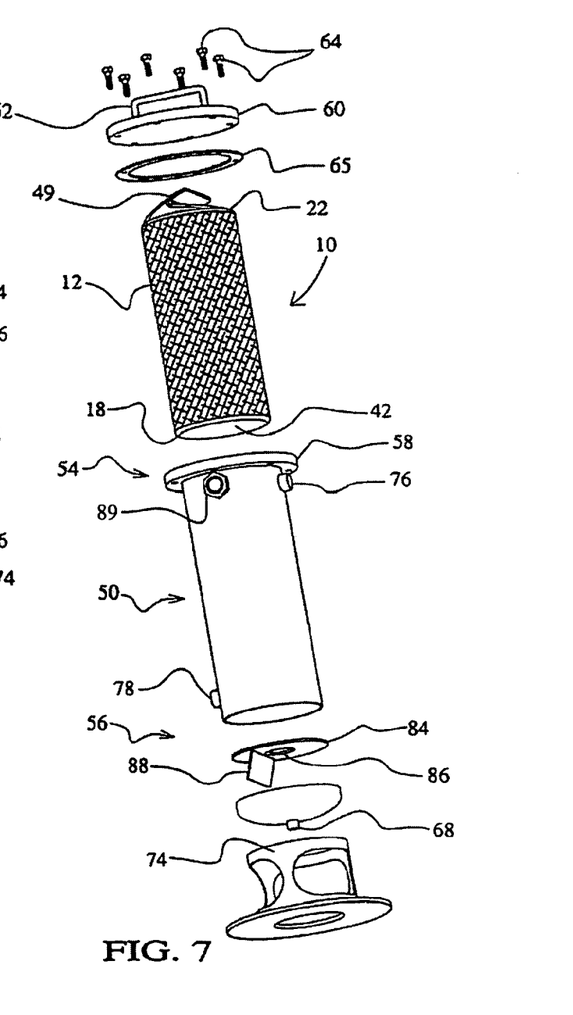
FIG. 7 is an exploded perspective view showing the dryer of FIG. 6 in combination with the cartridge.
Figure 8:
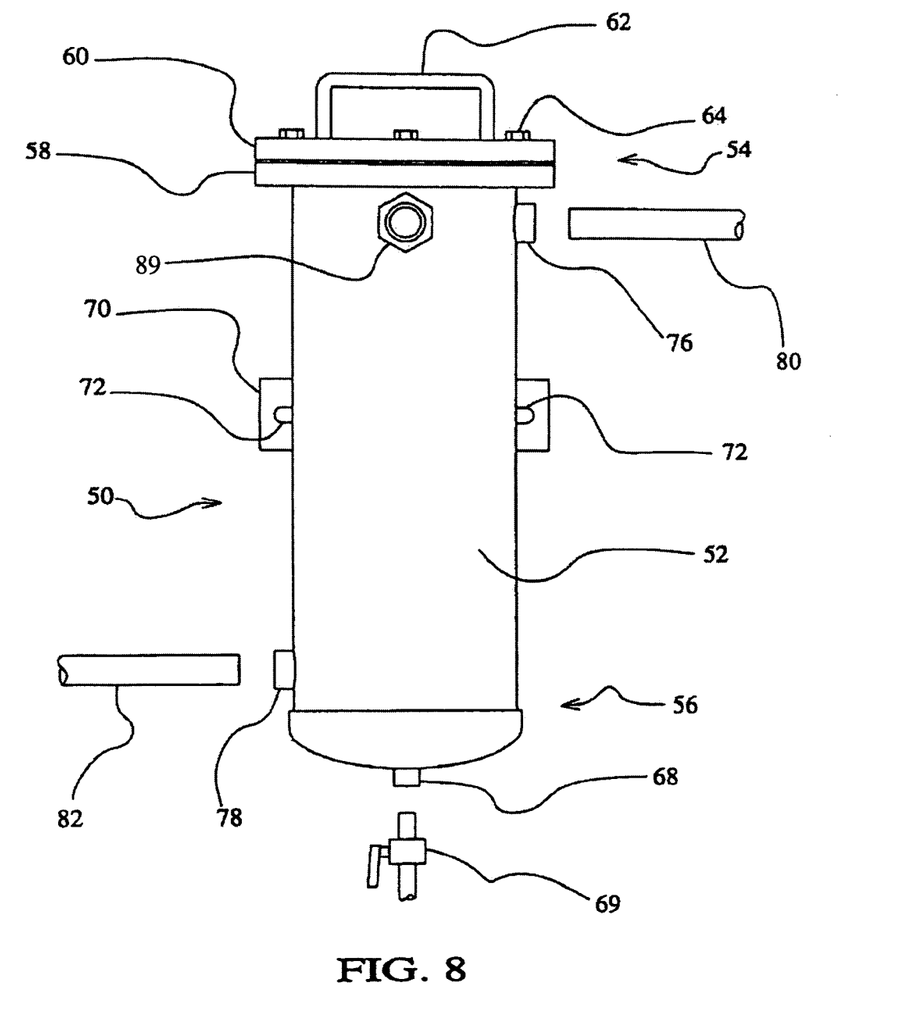
FIG. 8 is a side elevation view showing the dryer of FIG. 6 with a wall mount bracket for mounting the dryer to a wall.

Turning now to FIGS. 6-8, the cartridge 10 may be used in a dryer 50 that is adapted for near point-of-use installation in an air/gas line delivering compressed air or gas to an air/gas-driven tool.

As described in more detail in copending application Ser. No. 11/084,852, whose contents are incorporated herein, the dryer 50 as represented in FIGS. 6-8 comprises a main pressure vessel 52 having a first (upper) end 54 and a second (lower) end 56. The upper end 54 has a large central opening that provides access to the hollow interior of the pressure vessel 52. Surrounding this opening is a circumferential mounting flange 58 that is adapted to receive a cover plate 60 having a handle 62. Six fasteners 64 are used to retain the cover plate 60 on the mounting flange 58. A seal 65 (best shown in FIG. 7) is disposed between the cover plate 60 and the mounting flange 58 to ensure that pressure integrity is maintained within the dryer 50 during operation. Removal of the fasteners 64 and the cover plate 60 allows access to the interior of the pressure vessel 52, which defines a substantially hollow chamber for receiving the dryer cartridge 10, as shown in FIG. 7. It will be appreciated that the cover plate 60 could be secured to the mounting flange 58 using other techniques, such as by threaded engagement. In that configuration, the fasteners 24 would not be required. The seal 65 could also be changed from a flat seal to an o-ring seal and seated in a circumferential seal groove formed in the cover plate 60, the mounting flange 58, or both. The lower end 56 of the pressure vessel 52 defines a sump area that drains to a drain port 68 for removing liquid from the interior of the pressure vessel following the removal of liquid particulates from an air/gas stream. As shown in FIG. 8, a conventional ball valve 69 is mounted to the drain port 68 for releasing the collected liquid when required.

FIGS. 6-8 illustrate two alternative mounting schemes that may be used to support the dryer 50 at an installation location. In FIG. 8, a mounting bracket assembly 70 having two mounting holes 72 is formed on or attached to the pressure vessel 52. This configuration allows the dryer 50 to be mounted to a wall or other structure (not shown) near a point of use (e.g., the wall of a paint booth). In FIGS. 6 and 7, a stand 74 is formed on or attached to the lower end 56 of the pressure vessel 52. This configuration allows the dryer 50 to be supported on a floor or other surface (not shown) near a point of use (e.g., the floor of a paint booth). The handle 62 associated with the cover plate 60 may be used to pick up the dryer 50 and move it from one location to another.

As further shown in FIGS. 6-8, the pressure vessel 52 additionally comprises two air/gas ports 76 and 78 for installing the dryer 50 in a compressed air/gas line. As shown in FIG. 8, the port 76 is disposed proximate to the upper end 54 of the pressure vessel 52 and functions as an outlet port that is adapted to connect to an outlet line 80. The port 78 is disposed proximate to the lower end 56 of the pressure vessel 52 and functions as an inlet port that is adapted to connect to an inlet line 82. During dryer operation, the flow of air/gas through the dryer 50 begins at the lower inlet port 78, passes upwardly through the cartridge 10, and then exits through the outlet port 76. The dryer 50 is suited for installation near a point-of-use, such as upstream of an air/gas-driven tool (not shown) that is connected to the outlet line 80, and downstream of a compressed air/gas source (not shown) supplying compressed air or gas via the inlet line 82.

As best shown in FIG. 7, the upper end 22 of the cartridge 10 is adapted to be disposed proximate to the opening in the upper end 54 of the pressure vessel 52, where it is captured by the cover plate 60. The bottom end 18 of the cartridge 10 is adapted to be disposed proximate to the lower end 56 of the pressure vessel 52, where it rests on a liquid coalescer assembly 84. The coalescer assembly 84 is constructed as a plate mounted slightly above the inlet port 38 and provides a rigid, substantially planar cartridge support surface for the bottom wall 42 of the cartridge 10. The coalescer assembly 48 also includes a central aperture 86 to pass air/gas flow into the cartridge 10, and an angled baffle 88 extending below the aperture 86. The baffle 88 removes liquid particulates from the air/gas stream, before the particulates can reach the drying composition 14 in the cartridge 10.

The final component of the dryer 50 shown in FIGS. 6-8 is a dryness indicator 89 situated on the pressure vessel 52 proximate to the outlet port 76. The dryness indicator 89 is conventional in nature and comprises a site glass unit that is threadably mounted in an aperture extending through the pressure vessel wall. Disposed within the dryness indicator 89 is a dryness-indicating material, such as a moisture sensitive paper element or a quantity of color-changing desiccant.

Figure 9A:
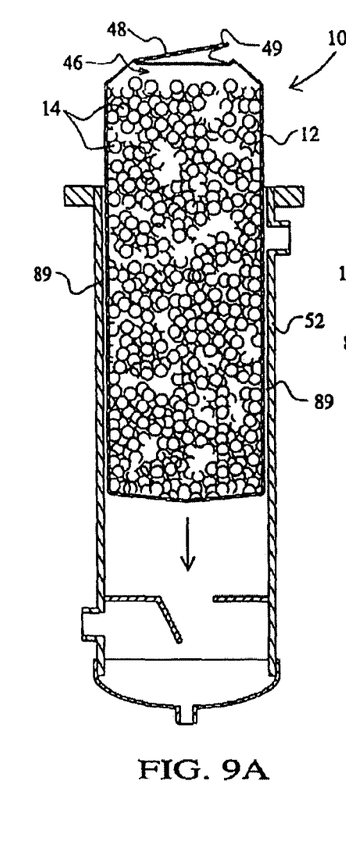
FIGS. 9A, 9B and 9C are cross-sectional centerline views showing the cartridge of FIG. 1 during insertion thereof into the dryer of FIG. 6.
Figure 9B:
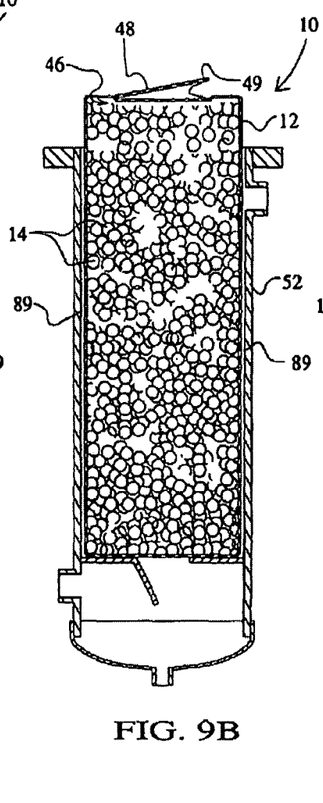
Figure 9C:
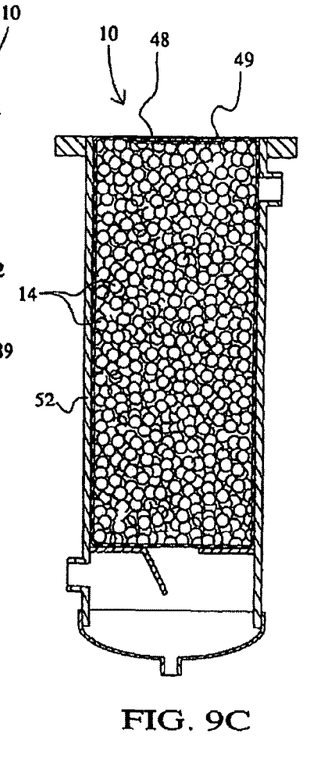

Turning now to FIGS. 9A, 9B and 9C, the cartridge 10 is shown during its insertion into the pressure vessel 52 of the dryer 50. As shown in FIGS. 9A and 9B, there is initially a gap 89 between the sidewall of the casing 12 and the inside wall of the pressure vessel 52 as the cartridge 10 is inserted and seated on the coalescer assembly 84. This is due to the fact that the cartridge 10 will cross-sectionally contract when it is picked up by the fold 48, which conveniently serves as a handle for the cartridge 10. Other handle configurations, (such as one or more straps, strings, tabs, folds, etc.) could also be provided on the cartridge 10 to facilitate lifting.

The cross-sectional contraction occurs as a result of the drying composition 14 flowing downwardly to bulge out the bottom wall 42 of the casing 12 (see FIG. 9A), and also flowing upwardly into the empty region 46 below the fold 48. Moreover, the filter material forming the casing 12 has some ability to stretch in both the longitudinal direction and the diametrical direction of the casing. Due to the ability of the cartridge 10 to assume the contracted configuration when lifted by the fold 48, it can be easily inserted into the dryer 50 without interference between the casing 12 and the inside wall of the pressure vessel 52. For a typically-sized pressure vessel 52 wherein the cartridge-holding chamber is approximately 5-6 inches in diameter by approximately 12-15 inches in length, lifting the cartridge 10 by the fold 48 should cause the casing 12 to cross-sectionally contract to the point where a gap 89 of at least approximately 0.06-0.125 inches is produced between the casing 12 and the pressure vessel 52.

Figure 10:
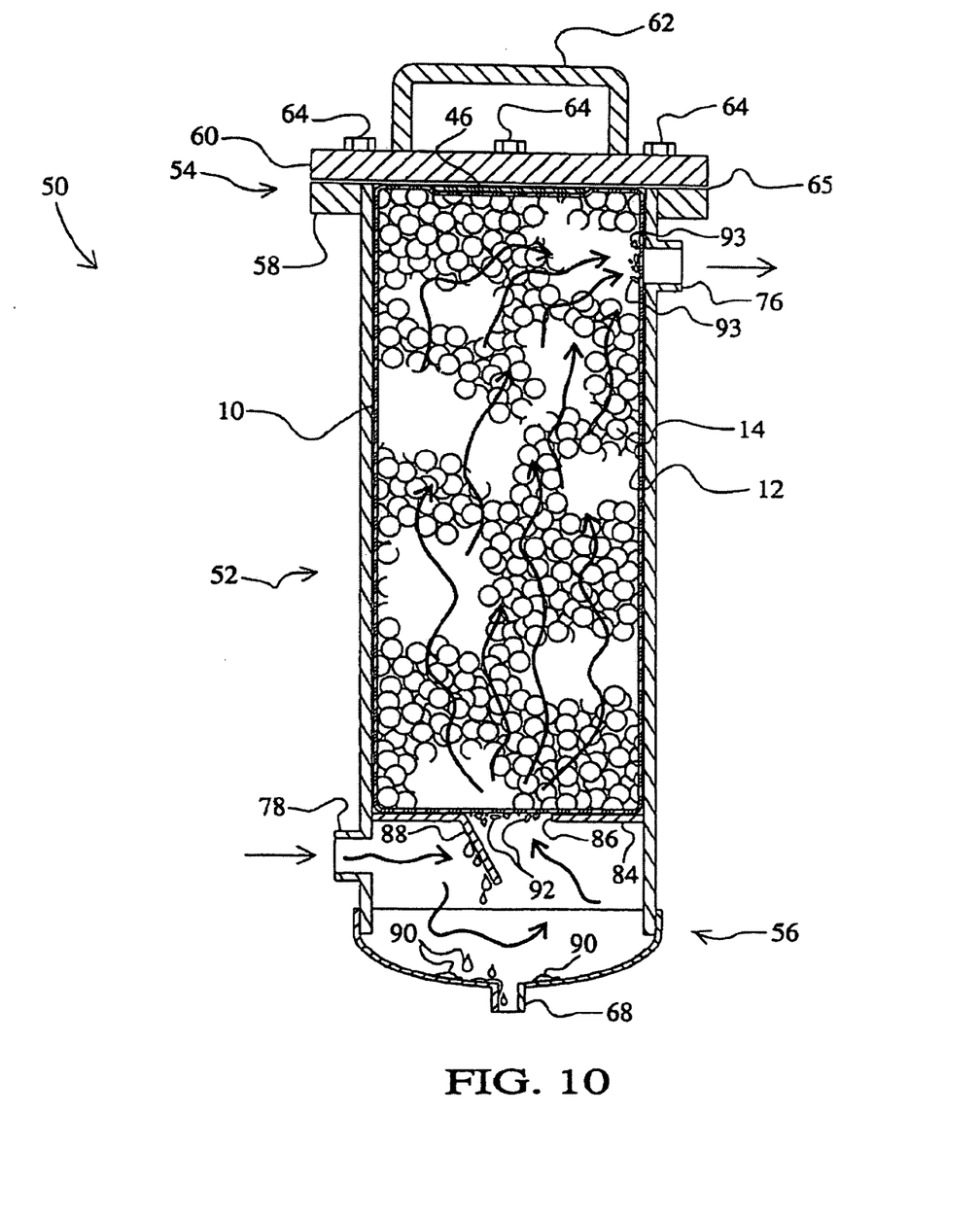
FIG. 10 is a cross-sectional centerline view showing the dryer of FIG. 6 with the cartridge seated therein in an operational configuration.

FIG. 9B shows the cartridge 10 after it has been seated on the coalescer assembly 84 but with the sidewall of the casing 10 still spaced from the inside wall of the pressure vessel 52. In this initial seating stage, the upper end of the casing 12 may protrude above the top of the pressure vessel 52 as a result of the drying composition 14 being in a relatively loosely packed state. This can be remedied by pushing or tapping down on the top of the casing 12, and/or by shaking or vibrating the pressure vessel 52 (if it is not wall-mounted) in order to settle, consolidate and compact the drying composition 14. As shown in FIG. 9C, this will cause the sidewall of the casing 12 to expand outwardly into contact with the inside wall of the pressure vessel 52. If the casing 12 has been filled with the correct amount of the drying composition 14, this material should level off at the top of the pressure vessel's mounting flange 58. The fold 48 is then pushed down to flatten the top of the casing 12. This is the operational configuration of the cartridge 10 and its casing 12. As shown in FIG. 10, the cover plate 60 may now be mounted, and the dryer 50 placed in operation.

With minimal experimentation, the correct amount of the drying composition 14 can be determined so that, upon settlement thereof, the fold 48 can be pushed down to the desired position. If too much of the drying composition 14 is used, it will not be possible to mount the cover plate 60. If not enough of the drying composition 14 is used, an air gap will exist beneath the cover plate 60. Preferably, the top of the casing 12 (when folded) should be flush with the cover plate's bottom surface, although a small gap not more than approximately 0.125-0.25 inches may be allowed. A larger gap could result in the cartridge 10 elongating in the lengthwise direction and narrowing in the widthwise direction during dryer operation, and thus losing contact with the inside wall of the pressure vessel 52. This would allow air/gas to channel around the outside of the casing 12. Channeling could also occur within the casing 12 as a result of the drying composition 14 becoming loose and unsettled. Moreover, because the cartridge 10 is not affirmatively connected to any structure within the dryer 50, and simply rests on the coalescer assembly 84, the application of air/gas pressure to the inlet side of the dryer 50 could shift the casing 12 upwardly with great force, possibly rupturing the casing by slamming it into the cover 60.

FIG. 10 illustrates the flow of compressed air/gas through the cartridge 10 during operation of the dryer 50. It will be seen that the compressed air/gas enters the lower portion 56 of the pressure vessel 52 via the inlet port 78. A substantial portion of the air/gas flow will impinge on the baffle 88. The baffle 88 will require the air/gas flow to divert around the edges of the baffle before flowing upwardly through the aperture 86 in the coalescer assembly 84. Liquid particulates, such as water droplets, oil droplets or the like, will tend to coalesce on the baffle 88, and condense out of the air/gas stream. These liquid particulates, shown (not to scale) by reference numeral 90 in FIG. 10, will roll off the baffle 88 under the force of gravity into the sump area situated around the drain port 68. The air/gas flow traveling upwardly through the aperture 86 will pass through the bottom wall 42 of the casing 12. As stated above, the porosity of the casing material is selected to provide a filtering function in order to filter dirt, dust, oil residue and other debris out of the air/gas stream. These filtered materials are shown (not to scale) by reference numeral 92 in FIG. 10. As the air/gas flow enters the cartridge 12, it dissipates through the packed drying composition 14, giving up moisture content as the air/gas flow moves upwardly toward the outlet port 76. Before emerging from the cartridge 12 at the outlet port 76, the air/gas flow must again pass through the casing material, and will thereby be filtered a second time to remove unwanted contaminants 93 (not to scale) that will mainly comprise very small particles of the drying composition 14 (e.g., desiccant dust). The air/gas flow emerging from the outlet port 76 will thus be moisture treated to provide a very dry air/gas stream for delivery to the point-of-use, and will also be filtered to remove oil, dirt and other contaminants. This filtering will occur at both the inlet and outlet ends of the cartridge 10.

As best shown in FIG. 7, to exchange the cartridge 10, the fasteners 64 are removed so that the cover 60 can lifted from the mounting flange 58. Because the cartridge 10 is not connected to any structure in the dryer 10, but simply rests on the cartridge support surface provided by the coalescer assembly 84, the cartridge can then be quickly pulled out of the pressure vessel 52 (by grasping the "handle" provided by the fold 48), and a replacement cartridge slipped in (and compacted as necessary). After checking the resilient member 65 and replacing as necessary, the cover 60 can be remounted and the fasteners 64 reattached. A quick release of the valve 69 (see FIG. 8) can also be performed at this point (and also at the beginning or end of each application session) to drain out liquid. It will be appreciated that the foregoing steps takes only moments of time, following which the dryer 50 will be fully restored and ready for many more cycles of operation. There is no need for confusing instructions, no maintenance, no direct handling of the drying composition 14, and no need for skilled or qualified personal. The spent cartridge 10 can either discarded or recycled.

Accordingly, a disposable dryer cartridge has been disclosed for an air/gas dryer apparatus adapted for installation in an air/gas line delivering compressed air or gas to an air/gas-driven tool. The disclosed cartridge is ideally suited for installation near a point-of-use, is easy to replace, and does not require messy drying composition handling. The cartridge additionally performs integrated filtering functions that may obviate the need for an external filter unit. Although various embodiments of the inventive dryer have been disclosed, it should be understood that the description and the drawings herein are merely illustrative, and that various modifications, combinations and changes can be made in accordance with the invention.

Figure 11:
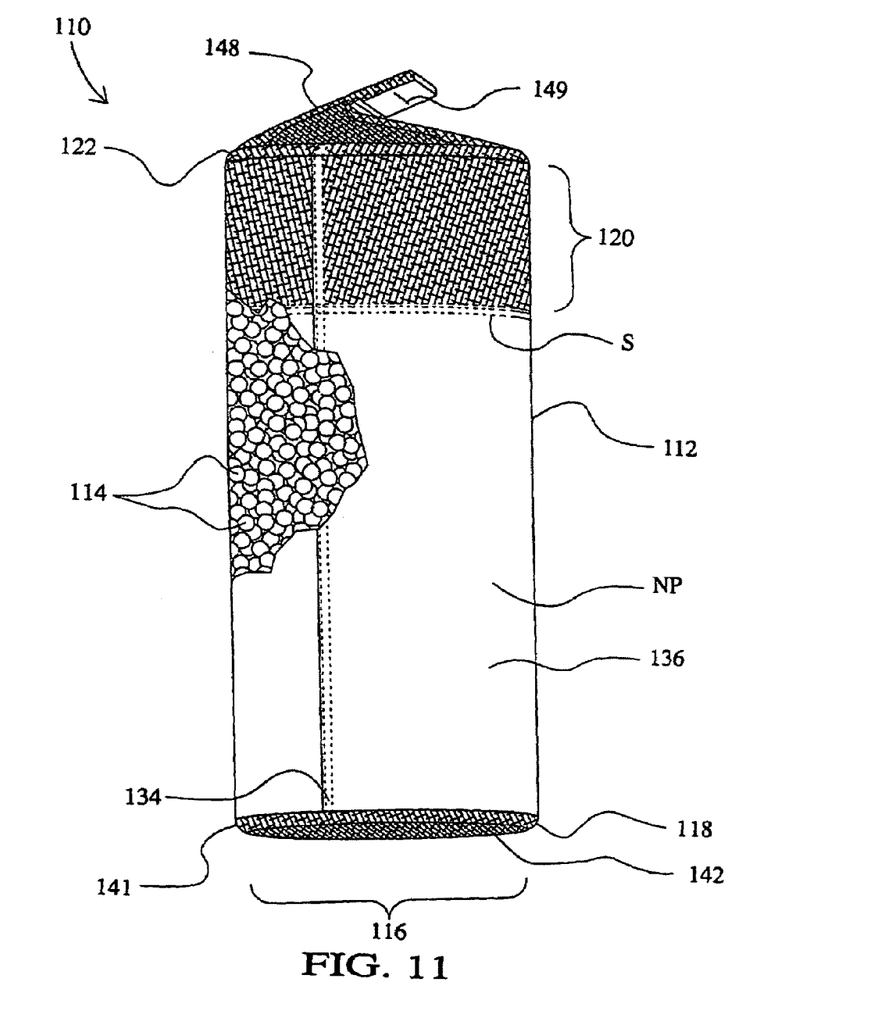
FIG. 11 is a perspective view showing an alternative disposable dryer cartridge constructed in accordance with the present invention.

For example, as shown in FIG. 11, a dryer cartridge 110 can be constructed that is identical in all respects to the cartridge 10 of FIGS. 1-4, component parts of the dryer cartridge 110, which correspond to the component parts of the cartridge 10, being designated by corresponding reference characters within the 100 series, except that a major section of the casing 112, designated as "NP", is made of a non-porous material that does not pass air/gas flow. The bottom edge of the section NP is seamed at 141 to the bottom wall 116 that provides the casing's air inlet, while the upper edge is seamed at "S" to the circumferential section 120 of the casing 12 that provides the air/gas outlet thereof. It will be appreciated, therefore, that the invention is not to be in any way limited except in accordance with the spirit of the appended claims and their equivalents.

What is claimed is:

1. A disposable air/gas dryer cartridge assembly for installation within an air/gas line delivering compressed air/gas to an air/gas-driven tool, comprising:

a dryer cartridge comprising a flexible elongated casing having a substantially cylindrical configuration which comprises a substantially tubular body portion defined around an axis, a substantially planar lower end portion disposed substantially perpendicular to said axis, and a substantially planar upper end portion disposed substantially perpendicular to said axis and disposed substantially parallel to said substantially planar lower end portion;

a drying composition disposed within said casing;

an air/gas inlet defined upon one end of said casing;

an air/gas outlet defined upon an opposite end of said casing remote from said air/gas inlet such that the compressed air/gas will traverse said drying composition as the compressed air/gas flows from said air/gas inlet to said air/gas outlet;

a housing having a peripheral wall member defining an interior space within said housing for accommodating said dryer cartridge, and a cartridge receiving opening defined within an upper end portion of said housing for permitting said dryer cartridge to be inserted into and removed from said housing;

an air/gas inlet port disposed upon said housing for conducting air/gas, to be dried, into said housing and through said dryer cartridge;

an air/gas outlet port disposed upon said housing for conducting dried air/gas out from said housing and toward the air/gas-driven tool;

a cartridge support surface disposed within said housing for supporting a first lower end portion of said dryer cartridge;

a cover member removably disposed upon said housing so as to cover and uncover said cartridge receiving opening defined within said upper end portion of said housing; and a substantially planar handle integrally formed up-on said upper end portion of said flexible elongated casing and movable between a first upwardly projecting position at which said handle can be used to lower and lift said dryer cartridge into and out from said housing, and a second downwardly folded position in order to become substantially coplanar with said substantially planar upper end portion of said flexible elongated casing so as to engage said cover member of said housing, when said dryer cartridge is disposed within said housing and said cover member is disposed upon said housing, such that said dryer cartridge substantially fills that portion of said interior space of said housing which is defined between an interior surface portion of said peripheral wall member of said housing, said cartridge support surface, and said cover member whereby the air space defined between said dryer cartridge and said housing is minimized such that the drying efficiency of said drying composition, disposed within said flexible elongated casing, is maximized;

said casing being self-configurable into a cross-sectionally contracted configuration when lifted by said handle so as to facilitate insertion of said dryer cartridge into and out from said housing.

2. An apparatus according to claim 1, wherein:
said casing comprises a filter media material.

3. An apparatus according to claim 2, wherein:
said filter media material is capable of filtering to approximately 0.1 micron or below.

4. An apparatus according to claim 2, wherein:
said inlet and said outlet are provided by virtue of some or all of said casing comprising said filter media material.

5. An apparatus according to claim 1, wherein:
said drying composition comprises a desiccant.

6. An apparatus according to claim 1, wherein:
said casing comprises a generally tubular side wall and a generally circular bottom wall at a first end thereof.

7. An apparatus according to claim 6, wherein:
said casing comprises a closure fold at a second end thereof.

8. An apparatus according to claim 7, wherein:
said closure fold forms said handle.

9. An apparatus according to claim 8, wherein:
a side portion of said casing is non-porous.

10. A method for fabricating a disposable air/gas dryer cartridge assembly for installation within an air/gas line delivering compressed air/gas to an air/gas-driven tool, comprising the steps of:
forming a dryer cartridge comprising a flexible elongated casing having a substantially cylindrical configuration which comprises a substantially tubular body portion defined around an axis, a substantially planar lower end portion disposed substantially perpendicular to said axis, and a substantially planar upper end portion disposed substantially perpendicular to said axis and disposed substantially parallel to said substantially planar lower end portion;
introducing a drying composition into said casing;
providing an air/gas inlet upon one end of said casing;
providing an air/gas outlet upon an opposite end of said casing remote from said air/gas inlet such that the compressed air/gas will traverse said drying composition as the compressed air/gas flows from said air/gas inlet to said air/gas outlet;
providing a housing having a peripheral wall member defining an interior space within said housing for accommodating said dryer cartridge, and a cartridge receiving opening defined within an upper end portion of said housing for permitting said dryer cartridge to be inserted into and removed from said housing;
providing an air/gas inlet port disposed upon said housing for conducting air/gas, to be dried, into said housing and through said dryer cartridge;
providing an air/gas outlet port disposed upon said housing for conducting dried air/gas out from said housing and toward the air/gas-driven tool;
providing a cartridge support surface within said housing for supporting a first lower end portion of said dryer cartridge;
removably disposing a cover member upon said housing so as to cover and uncover said cartridge receiving opening defined within said upper end portion of said housing;
integrally forming a substantially planar handle upon said upper end portion of said flexible elongated casing, after said casing has been filled with said drying composition, such that said handle is movable between a first upwardly projecting position at which said handle can be used to lower and lift said dryer cartridge into and out from said housing, and a second downwardly folded position in order to become substantially coplanar with said substantially planar upper end portion of said flexible elongated casing so as to engage said cover member of said housing, when said dryer cartridge is disposed within said housing and said cover member is disposed upon said housing, such that said dryer cartridge substantially fills that portion of said interior space of said housing which is defined between an interior surface portion of said peripheral wall member of said housing, said cartridge support surface, and said cover member whereby the air space defined between said dryer cartridge and said housing is minimized such that the drying efficiency of said drying composition, disposed within said flexible elongated casing, is maximized; and
forming said casing so as to be self-configurable into a cross-sectionally contracted configuration when lifted and lowered by said handle so as to facilitate insertion of said dryer cartridge into and out from said housing.

11. A method according to claim 10, wherein:
said casing is formed by joining together a first sheet that forms a sidewall of said casing and a second sheet that forms a bottom wall of said casing.

12. A method according to claim 11, wherein:
said inlet and said outlet are provided by virtue of said sheets comprising filter media material.

13. A method according to claim 10, wherein:
said drying composition is introduced into said casing by placing said casing in a mold and pouring said drying composition into said casing.

14. A method according to claim 13, wherein:
said mold has a cross-sectional size and shape that conforms to a cartridge-holding chamber defined within the air/gas dryer housing in which said cartridge is to operate; and
said mold has a length that is longer than said cartridge-holding chamber.

15. A method according to claim 14, wherein:
the top of said mold is used as a gauge for measuring said drying composition.

16. A method according to claim 15, wherein:
said casing is folded with a closure fold following filling of said casing with said drying composition.

17. A method according to claim 16, wherein:
said closure fold defines said handle.

18. A method of forming a disposable air/gas dryer cartridge assembly for installation within an air/gas line delivering compressed air/gas to an air/gas-driven tool, comprising the steps of:
selecting a dryer cartridge that comprises a flexible elongated casing having a substantially cylindrical configuration comprising a substantially tubular body portion defined around an axis, a substantially planar lower end portion disposed substantially perpendicular to said axis, and a substantially planar upper end portion disposed substantially perpendicular to said axis and disposed substantially parallel to said substantially planar lower end portion;

introducing a drying composition into said casing;

providing an air/gas inlet upon one end of said casing;

providing an air/gas outlet upon an opposite end of said casing remote from said air/gas inlet such that the compressed air/gas will traverse said drying composition as the compressed air/gas flows from said air/gas inlet to said air/gas outlet;

providing a housing having a peripheral wall member defining an interior space within said housing for accommodating said dryer cartridge, and a cartridge receiving opening defined within an upper end portion of said housing for permitting said dryer cartridge to be inserted into and removed from said housing;

providing an air/gas inlet port disposed upon said housing for conducting air/gas, to be dried, into said housing and through said dryer cartridge;

providing an air/gas outlet port disposed upon said housing for conducting dried air/gas out from said housing and toward the air/gas-driven tool;

providing a cartridge support surface within said housing for supporting a first lower end portion of said dryer cartridge;

removably disposing a cover member upon said housing so as to cover and uncover said cartridge receiving opening defined within said upper end portion of said housing;

forming said casing so as to be self-configurable into a cross-sectionally contracted configuration when lifted and lowered so as to facilitate insertion into and removal from said air/gas dryer housing;

integrally forming a substantially planar handle upon said upper end portion of said flexible elongated casing, after said casing has been filled with said drying composition, such that said handle is movable between a first upwardly projecting position at which said handle can be used to lower and lift said dryer cartridge into and out from said housing, and a second downwardly folded position in order to become substantially coplanar with said substantially planar upper end portion of said flexible elongated casing so as to engage said cover member of said housing, when said dryer cartridge is disposed within said housing and said cover member is disposed upon said housing, such that said dryer cartridge substantially fills that portion of said interior space of said housing which is defined between an interior surface portion of said peripheral wall member of said housing, said cartridge support surface, and said cover member whereby the air space defined between said dryer cartridge and said housing is minimized such that the drying efficiency of said drying composition, disposed within said flexible elongated casing, is maximized;

grasping said handle and lifting said casing so as to effect said cross-sectionally contracted configuration;

inserting said casing into housing; and manipulating said casing as necessary to reconfigure said casing from said cross-sectionally contracted configuration to an operational configuration wherein said casing is not cross-sectionally contracted and wherein said drying composition is compacted.

19. The method as set forth in claim 18, further comprising the steps of:

forming said casing by joining together a first sheet that forms a sidewall of said casing and a second sheet that forms a bottom wall of said casing; and said inlet and said outlet are provided by virtue of said sheets comprising filter media material.

20. The method as set forth in claim 18, further comprising the steps of:

introducing said drying composition into said casing by placing said casing in a mold and pouring said drying composition into said casing; and providing said mold so as to have a cross-sectional size and shape that conforms to a cartridge-holding chamber defined within said housing in which said cartridge is to operate, a length dimension that is longer than said cartridge-holding chamber of said housing, and wherein a top portion of said mold is used as a gauge for measuring said drying composition.

* * * * *